United States Patent Office 3,399,968
Patented Sept. 3, 1968

3,399,968
PROCESS FOR THE PURIFICATION OF AQUEOUS SOLUTIONS OF HYDROGEN PEROXIDE
Licio Amodeo and Renzo Naldini, Solvay, Rosignano, Italy, assignors to Solvay & Cie, Brussels, Belgium, a Belgian corporation
No Drawing. Filed Feb. 23, 1967, Ser. No. 617,861
Claims priority, application France, Feb. 24, 1966, 50,944
5 Claims. (Cl. 23—207)

ABSTRACT OF THE DISCLOSURE

The purification of aqueous solutions of hydrogen peroxide by adsorbing organic impurities contained therein on activated charcoal is improved by preliminarily partially deactivating the activated charcoal by adsorbing thereon an organic material (which is inert with respect to hydrogen peroxide.)

Background of the invention

This invention relates to a process for the purification of aqueous solutions of hydrogen peroxide. More particularly, the present invention relates to a process for the separation of organic impurities contained in these solutions.

The preparation of hydrogen peroxide from alkylanthraquinone is known. This process is cyclic and comprises the catalytic hydrogenation of an alkylanthraquinone dissolved in an organic medium immiscible in water to yield the corresponding alkylanthrahydroquinone which is then oxidized by means of air or oxygen to yield hydrogen peroxide. The process further comprises the regeneration of the alkylanthraquinone, the extraction of hydrogen peroxide by means of water and the recycling of the alkylanthraquinone to the hydrogenation step.

The above process produces aqueous solutions of hydrogen peroxide which contain organic impurities, for example, alkylanthraquinones, resulting from the solution in which the hydrogen peroxide is produced, an solvents carried along during the extraction with water. The impurities may also consist of by-products of the above specified impurities which by-products are difficult to identify.

Even at low concentrations, these organic impurities are troublesome. Aqueous solutions of hydrogen peroxide containing them are unsuitable for many uses. It is highly desirable that these impurities be separated.

There are numerous known methods for separating impurities such as, for example, distillation, solvent extraction, and the like, but, in some cases, the aqueous solutions of hydrogen peroxide purified by these methods still contain undesirable amounts of organic impurities.

In order to attain a more complete purification of these solutions, it has been proposed to adsorb these organic impurities by means of activated charcoal. However, even when the aqueous solutions of hydrogen peroxide are stabilized before the purification step, there is always significant decomposition of the hydrogen peroxide. This decomposition may be dangerous, especially when the charcoal is granulated.

Summary of the invention

According to the invention, it has been found that it is possible to purify the aqueous solutions of hydrogen peroxide containing organic impurities by adsorption of these impurities on activated charcoal, even in a granulated form, without a noticeable decomposition of the hydrogen peroxide.

In further accordance with the invention, it has been determined that the decomposition of hydrogen peroxide when in contact with activated charcoal is very rapid at first, but slows down very rapidly to an acceptable rate after less than two hours. The rate of adsorption of the organic impurities on activated charcoal also decreases as the reaction proceeds but this rate is much lower than the aforementioned rate so that the adsorption capacity of the activated charcoal is still satisfactory for some time even when any danger of sudden decomposition of hydrogen peroxide has disappeared.

In still further accordance with the invention, it has been found that the rapid decrease of the catalytic decomposition activity of the activated charcoal, the charcoal acting as a catalyst for the decomposition of the hydrogen peroxide, is mainly due to a partial adsorption of impurities contained in the aqueous solution of hydrogen peroxide to be purified. Consequently, in accordance with the invention, there is used from the outset of the purification activated charcoal which has lost a major part of its catalytic decomposition activity with respect to hydrogen peroxide.

The invention comprises purifying aqueous solutions of hydrogen peroxide containing organic impurities by adsorption of these impurities on activated charcoal which has already been partially deactivated by adsorption thereon of organic materials.

Description of the preferred embodiments

A very simple method for deactivating the activated charcoal is to treat the activated charcoal with an aqueous solution of hydrogen peroxide which contains organic impurities, until a substantial decrease of the decomposition rate of the hydrogen peroxide is attained. This result is obtained when the activated charcoal has adsorbed approximately 3 grams of organic impurities per kilogram of charcoal.

After separation of the aqueous phase, the activated charcoal which has been partially deactivated may be used to purify large quantities of an aqueous solution of hydrogen peroxide without incurring the risk of a violent decomposition.

At first glance, this process may seem disadvantageous since a consequence is that a portion of the aqueous solution of hydrogen peroxide has to be given up. However, such a loss is negligible since it happens only once. The partially deactivated charcoal adsorbs the organic impurities until its adsorption capacity is exhausted. Afterwards, it is incompletely reactivated by means known per se, for example by treatment with steam under pressure, in order that it may be used to purify additional quantities of aqueous solution of hydrogen peroxide.

In a preferred embodiment according to the invention, the partial deactivation of the activated charcoal is carried out by impregnating the activated charcoal with an organic solvent which is inert with respect to hydrogen peroxide and immiscible with water. Among these solvents, preferred are unsubstituted and substituted hydrocarbons, such as heptane, carbon tetrachloride, and the like. Carbon tetrachloride is particularly preferred since its use results in a better purification than the use of heptane and it has the advantage over heptane of not being inflammable. However, it is emphasized that other unsubstituted and substituted hydrocarbons such as hexane, trichloroethylene, perchloroethylene, and the like, can also be used successfully.

Even though there is some decrease in the adsorption capacity of the activated charcoal by treating it with organic solvents, a very suitable degree of purification is still obtained which is even higher than the limits generally considered to be sufficient.

It is found for each activated charcoal tested that the decomposition of aqueous solutions of hydrogen peroxide is substantially lower when the activated charcoal has been treated with an organic solvent.

The extent of impregnation of the solvent in the activated charcoal varies according to the nature of the solvent. The amount of solvent impregnated in the activated charcoal can be as high as 20–40% of the weight of the activated charcoal, in the case of a substantially light solvent. Even within these limits, a major portion of the solvent stays adsorbed on the activated charcoal during the purification process and only traces thereof are carried along by the aqueous solution of hydrogen peroxide which has been purified. In order to remove the light solvent therefrom, air or an inert gas may be bubbled through the aqueous solution of hydrogen peroxide which has been purified.

The impregnation of activated charcoal by the light solvent may be carried out very easily. The activated charcoal is immersed in the solvent and is thereafter dried in air until the desired extent of impregnation is obtained.

The activated charcoal may be used in the following forms; powders, granules, pieces, or scales. Before being treated with the light solvent, the activated charcoal should be washed with an acid in order to remove metallic ions, which are known decomposition catalysts of hydrogen peroxide.

Particularly good results have been obtained by using activated charcoal powder. However, since the particles of charcoal powder are hard to separate after they have been treated with the organic solvent, it is preferred to pass the solution to be purified through a column filled with granular or pieces of activated charcoal which have been impregnated with the organic solvent. By resorting to this preferred embodiment, the difficulty of separating charcoal powder particles is avoided and the process may be carried out continuously. A series of at least two columns is particularly effective.

The process according to the present invention may be used to purify crude solutions of hydrogen peroxide such as those obtained from a cyclic manufacturing process, distilled aqueous solution of hydrogen peroxide or aqueous solutions which have already been submitted to other purification or separation treatments.

The process according to the invention will be illustrated in detail by means of the following examples which are not intended to limit the scope of the invention.

In the following examples, activated charcoals sold by CECA under the commercial names GP, 50 S, APC–3, ACL 40/3 and SA 1342 are used.

The GP and 50 S charcoals are in powder forms. Their granular composition is given hereunder. The APC–3 and ACL 40/3 charcoals are granulated charcoals, and the average diameter of the granules is approximately 3 mm.; their apparent specific weight under compression is on the order of 0.40 to 0.50 kg./dm.$^3$. The SA 1342 charcoal is sold in scale form, the scales measuring 2–10 mm.

In Table I, the granulometric classification of the APC–3 and SA 1342 charcoals after crushing in the laboratory is given. They are used in this particular state for the tests.

TABLE I.—GRANULOMETRIC COMPOSITION OF CHARCOALS

|  | GP | 50 S | APC–3 crushed | SA 1342 crushed |
|---|---|---|---|---|
| 0.250 mm., g./kg. |  |  | 666 | 506 |
| Class 0.250–0.149, g./kg. |  |  | 92 |  |
| Class 0.149–0.125, g./kg. |  |  | 32 | 24 |
| Class 0.125–0.088, g./kg. | 35 | 70 | 44 | 30 |
| Class 0.088–0.062, g./kg. |  |  | 39 | 30 |
| Class 0.062–0.044, g./kg. |  |  | 37 | 43 |
| Class 0.044–0.030, g./kg. | 35 | 20 |  |  |
| Class 0.030–0.020, g./kg. | 70 | 60 |  |  |
| Class 0.020–0.010, g./kg. | 255 | 160 | 90 | 289 |
| Class 0.010–0.005, g./kg. | 305 | 260 |  |  |
| 0.005, g./kg. | 300 | 430 |  |  |

Examples of tests carried out batchwise

In a 750 cc. glass container which has been treated and neutralized with 14 N nitric acid, there is introduced either 15 g. of dry activated charcoal or the partially deactivated activated charcoal resulting from impregnating 15 g. of the activated charcoal with a light inert solvent, namely, carbon tetrachloride, and 300 cc. of an aqueous solution of hydrogen peroxide. The container is kept at a constant temperature of 25° C. and the mixture of the activated charcoal and the aqueous solution of hydrogen peroxide is agitated continuously for 1 hour by means of a glass agitator which has also been neutralized with nitric acid. The activated charcoal is thereafter separated by filtration. In the tests employing the solvent-impregnated charcoal, in order to eliminate the traces of the solvent carried along, nitrogen is bubbled through the aqueous solutions which have been purified by the treatment with the solvent-impregnated charcoal.

The results of the tests are given in Table 2. In this table, the organic impurities contents are expressed as total C and are given in mg. per kg. of aqueous solution of hydrogen peroxide. The aqueous solution of hydrogen peroxide to be purified contained before treatment 215 g. of $H_2O_2$ per kg. of solution, and the content of organic impurities was 154 mg. of total C per kg. of solution.

Examples of dynamic tests in a column

The tests are carried out in a Pyrex column having a height of 650 mm. and a diameter of 20 mm. which is filled with 55 g. of APC–3 granulated activated charcoal.

The temperature within the column is maintained at 20° C. with the exception of Tests 6 and 7 which are carried out at −10° C.

The activated charcoal column is continuously soaked and the tests are started by using pure water, to prevent a sudden release of gas ($O_2$ from an initial significant decomposition of $H_2O_2$ and gas adsorbed on the activated charcoal).

The flow of oxygenated water is varied. All the samples taken at the exit of the purifying column are filtered on glass pieces and have pure and dry nitrogen bubbled through them for 30 minutes. This last treatment obviously is not applied when no impregnating agents are used.

The results of these above tests are given below in Table III. In this table, T represents the $H_2O_2$ content expressed in g. of $H_2O_2$/kg. of an aqueous solution of $H_2O_2$, and C represents the organic impurities content expressed in mg. of total carbon/kg. of an aqueous solution of $H_2O_2$.

TABLE II

| Variety and appearance of activated charcoal | Tests without impregnating agent | | Tests with impregnating agent ($CCl_4$) | | |
|---|---|---|---|---|---|
|  | $H_2O_2$ content | Total C | Extent of impregnation, g. of $CCl_4$/100 g. of dry charcoal | $H_2O_2$ content, g./kg. | Total C |
| GP (powder) | 187.5 | 2 | 33.9 | 213.5 | 39.5 |
| 50 S (powder) | 202 | 3 | 34.7 | 207 | 14.5 |
| APC–3 as is (granules) | 183 | 7.5 | 34.5 | 203 | 31.5 |
| APC–3 crushed | 179 | 1.5 | 34.7 | 208.5 | 18.5 |
| SA 1342 as is (scales) | 184.5 | 2 | 35.0 | 200.5 | 22 |
| SA 1342 crushed | 179.5 | 0.5 | 35.0 | 198 | 19.5 |

TABLE III

| Test No. | Impregnating agent | | Flow rate, l./hr. | Column temperature, °C | Initial values, at column inlet | Values obtained for the purified solutions after— | | | | | | | | | |
|---|---|---|---|---|---|---|---|---|---|---|---|---|---|---|---|
| | Nature | Extent of impregnation, g. of impregnating agent/ 100 g. of dry charcoal | | | | ½ | 1 | 2 | 3 | 4 | 5 | 6 | 7 | 8 | 9 |
| | | | | | | Hours of operation of purifying column | | | | | | | | | |
| 1 | | | 0.5 | 20 | T: 225 / C: 190 | 103 / 10 | 167 / 20 | 200 / 30 | 200 / 30 | | 203 / 40 | | 211 / 60 | | 212 / 60 |
| 2 | Heptane | 31 | 0.5 | 20 | T: 225 / C: 190 | 219 / 130 | 221 / 120 | 223 / 130 | 221 / 130 | | 224 / 150 | | 224 / 150 | | 223 / 150 |
| 3 | CCl₄ | 31 | 0.5 | 20 | T: 225 / C: 190 | 215 / 50 | 214 / 50 | 221 / 80 | 221 / 90 | 221 / 100 | 221 / 110 | 221 / 110 | 221 / 110 | 221 / 110 | |
| 4 | CCl₄ | 31 | 0.25 | 20 | T: 225 / C: 190 | 194 / 40 | 186 / 30 | 199 / 30 | 200 / 40 | 208 / 30 | 208 / 40 | 209 / 40 | 209 / 40 | 210 / 40 | |
| 5 | CCl₄ | 31 | 0.8 | 20 | T: 225 / C: 190 | 194 / 50 | 215 / 50 | 216 / 50 | | | | | | | |
| 6 | | | 0.5 | −10 | T: 225 / C: 180 | | 207 / 20 | 212 / 20 | | 215 / 20 | | 215 / 20 | | | |
| 7 | CCl₄ | 31 | 0.5 | −10 | T: 225 / C: 180 | | 216 / 50 | 220 / 70 | | 222 / 110 | | 222 / 120 | | | |
| 8 | | | 0.5 | 20 | T: 514 / C: 190 | 109 / 30 | 380 / 10 | 447 / 10 | 475 / 10 | 480 / 20 | 487 / 40 | 481 / 50 | 486 / 50 | 485 / 60 | |
| 9 | CCl₄ | 31 | 0.5 | 20 | T: 514 / C: 190 | 419 / 20 | 488 / 20 | 505 / 50 | 507 / 60 | 504 / 80 | 505 / 80 | | 510 / 100 | | |

Examples of tests employing a series of columns

A series of 3 glass columns (diameter, 20 mm.; useful height, 1 m.) supplied with activated charcoal and maintained at a constant temperature of 20° C. are arranged in series, i.e., there are provided a conduit connecting the outlet of the first column to the inlet of the second column and a conduit connecting the outlet of the second column to the inlet of the third column.

All of these tests are carried out with ACL 40/3 charcoal, as is or impregnated.

The results are given in Table IV. Part A of this table corresponds to the tests in which there was no impregnation and the conditions are:

Quantity of charcoal in—  G.
1st column _____ 68
2nd column _____ 69
3rd column _____ 65

Height of the charcoal bed in each column: approx. 0.45 m.

Flow rate of the solutions to be purified: 2.5 liters per hour.

Part B of Table IV corresponds to tests in which the charcoal was impregnated with carbon tetrachloride and the conditions are:

Extent of impregnation of the charcoal: 38 g. CCl₄/100 g. of dry charcoal.

Quantity of impregnated charcoal in—  G.
1st column _____ 90
2nd column _____ 90
3rd column _____ 90

The above represents a total of 270 g. of impregnated charcoal which corresponds to 195 g. of dry charcoal or a quantity slightly smaller than what was used in the part A tests.

Height of the charcoal bed in each column: approx. 0.45 m.

Flow rate of the solutions to be purified: 2.7 liters per hour.

In Table IV, the letters T and C have the same meaning as in Table III.

TABLE IV

| | Quantity of solution treated, liters | H₂O₂ at inlet | | H₂O₂ at the outlet, 1st column | | H₂O₂ at the outlet, 2nd column | | H₂O₂ at the outlet, 3rd column | |
|---|---|---|---|---|---|---|---|---|---|
| | | T | C | T | C | T | C | T | C |
| Part A: Non impregnated activated charcoal | 2.5 | 212 | 103 | 195 | 15 | 175 | 2 | 147 | 2 |
| | 12.5 | 212 | 103 | 207 | 54 | 199 | 19 | 188 | 12 |
| | 22.5 | 212 | 103 | 210 | 62 | 205 | 34 | 199 | 15 |
| | 32.5 | 212 | 103 | 210 | 71 | 206 | 48 | 203 | 30 |
| | 42.5 | 217 | 98 | 214 | 76 | 211 | 61 | 208 | 42 |
| | 52.5 | 217 | 98 | 214 | 76 | 213 | 68 | 210 | 46 |
| Part B: Activated charcoal impregnated with CCl₄ | 2.7 | 234 | 121 | 224 | 28 | 220 | 16 | 215 | 10 |
| | 13.5 | 234 | 121 | 228 | 67 | 225 | 38 | 224 | 22 |
| | 24.3 | 234 | 121 | 230 | 91 | 227 | 58 | 224 | 34 |
| | 35.1 | 234 | 121 | 234 | 96 | 230 | 62 | 228 | 46 |
| | 45.9 | 234 | 121 | 234 | 96 | 232 | 72 | 231 | 58 |
| | 62.1 | 234 | 121 | 234 | 109 | 233 | 94 | 233 | 85 |

Although specific embodiments of the invention are described in the specification, it will be understood that various modifications are permissible within the spirit of the invention, the scope of which is to be determined from the appended claims only.

What we claim and desire to secure by Letters Patent is:

1. In the process for the purification of an aqueous solution of hydrogen peroxide containing organic impurities by contacting the solution with activated charcoal thereby the adsorb the impurities on the charcoal and subsequently recovering the thusly purified aqueous solution of hydrogen peroxide, the improvement which comprises, prior to said contacting and said recovering, contacting said activated charcoal with an organic solvent which is inert with respect to hydrogen peroxide and immiscible with water thereby to impregnate the charcoal with the solvent and thus partially deactivate the charcoal.

2. Process according to claim 1, in which said solvent is CCl₄ and the quantity of the CCl₄ impregnated in the activated charcoal is 20 to 40 parts by weight of CCl₄ per 100 parts by weight of the activated charcoal.

3. Process according to claim 1, wherein the contacting for the purpose of subsequently recovering a purified aqueous solution of hydrogen peroxide is carried out by continuously passing the aqueous solution of hydrogen peroxide to be purified and recovered serially through at least two columns containing the partially deactivated charcoal.

4. In the process for the purification of an aqueous solution of hydrogen peroxide containing carbonaceous impurities originating from the process of production of hydrogen peroxide by the alternate hydrogenation and oxidation of an alkylanthraquinone, by contacting the aqueous solution with activated charcoal thereby to adsorb the impurities on the charcoal and subsequently recovering the thus-purified aqueous solution of hydrogen peroxide, the improvement which comprises, prior to said contacting and said recovering impregnating said activated charcoal with a solvent selected from the group consisting of hydrocarbon and halogen substituted hydrocarbon, which is inert with respect to hydrogen peroxide and immiscible with water, thereby to adsorb the solvent on the charcoal and thus partially deactivate the charcoal.

5. A process according to claim 4 in which said solvent is $CCl_4$ and the quantity of the $CCl_4$ impregnated in the activated charcoal is 20 to 40 parts by weight of $CCl_4$ per 100 parts by weight of the activated charcoal.

References Cited

UNITED STATES PATENTS 2,919,975    1/1960    Moore _____ 23—207

OSCAR R. VERTIZ, *Primary Examiner.*

H. S. MILLER, *Assistant Examiner.*